Jan. 19, 1932.　　　　E. H. MERRITT　　　　1,841,544
VENEER STRIPPING AND CLIPPING MACHINE
Filed Feb. 18, 1929　　　5 Sheets-Sheet 1
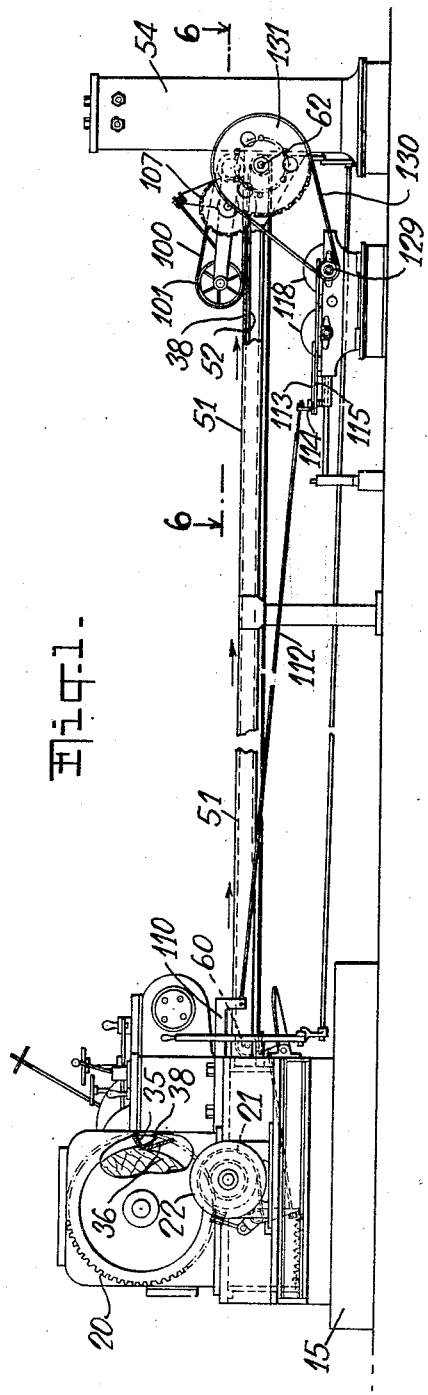
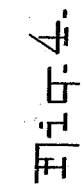
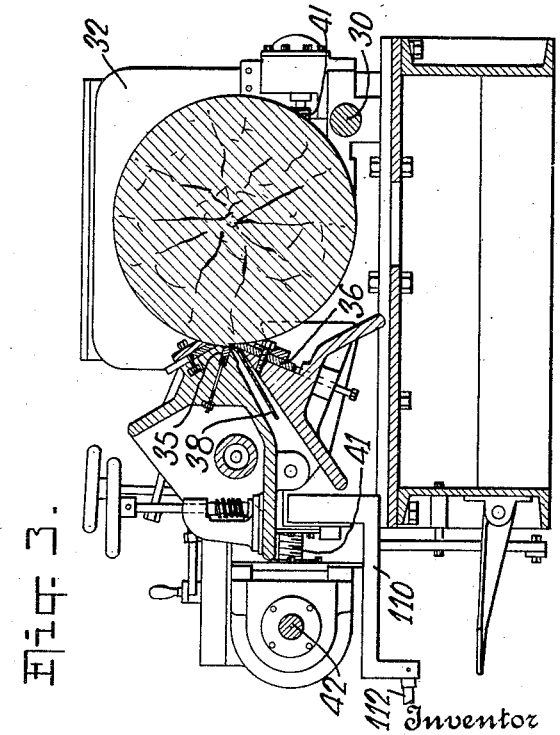
Inventor
Ericsson H. Merritt
By Attorney
Warfield & Watson

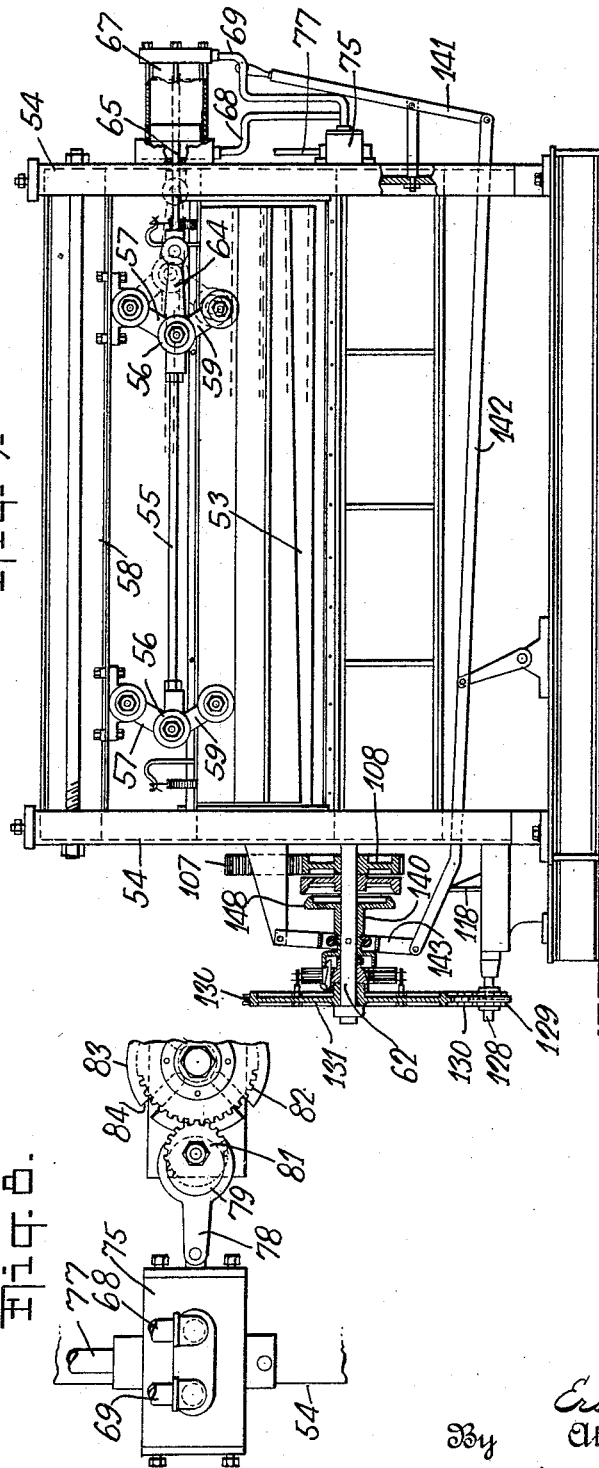

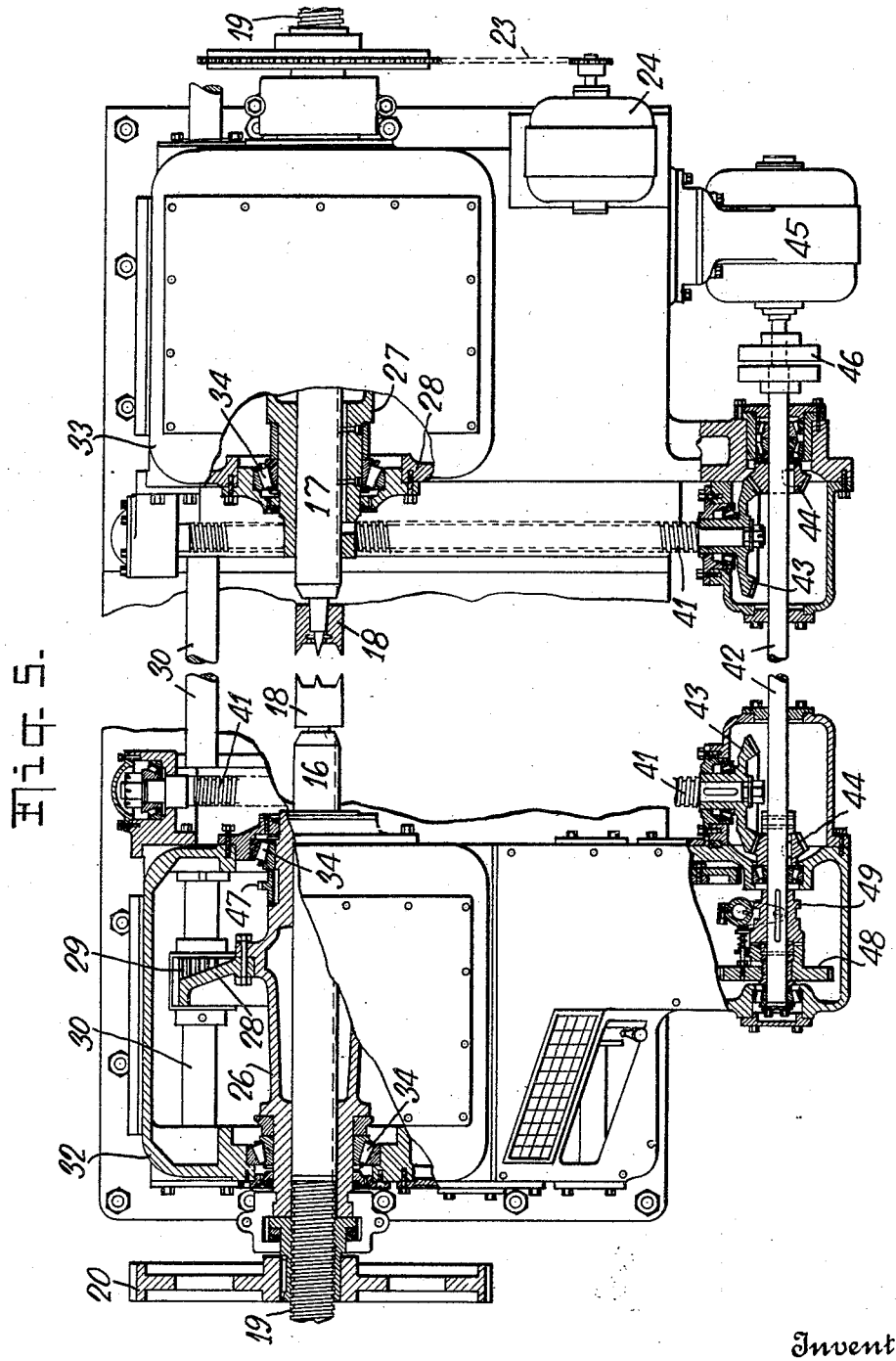

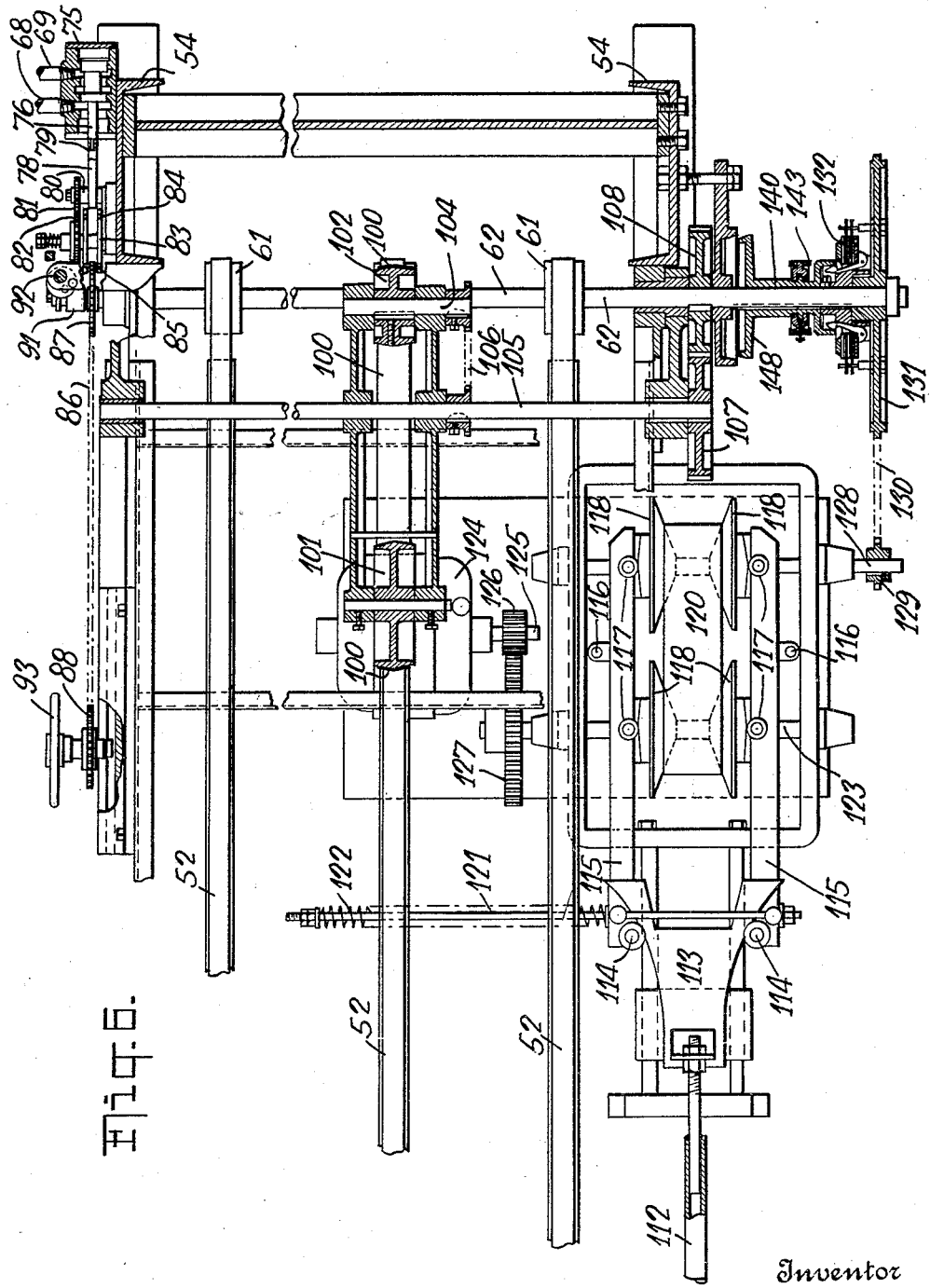

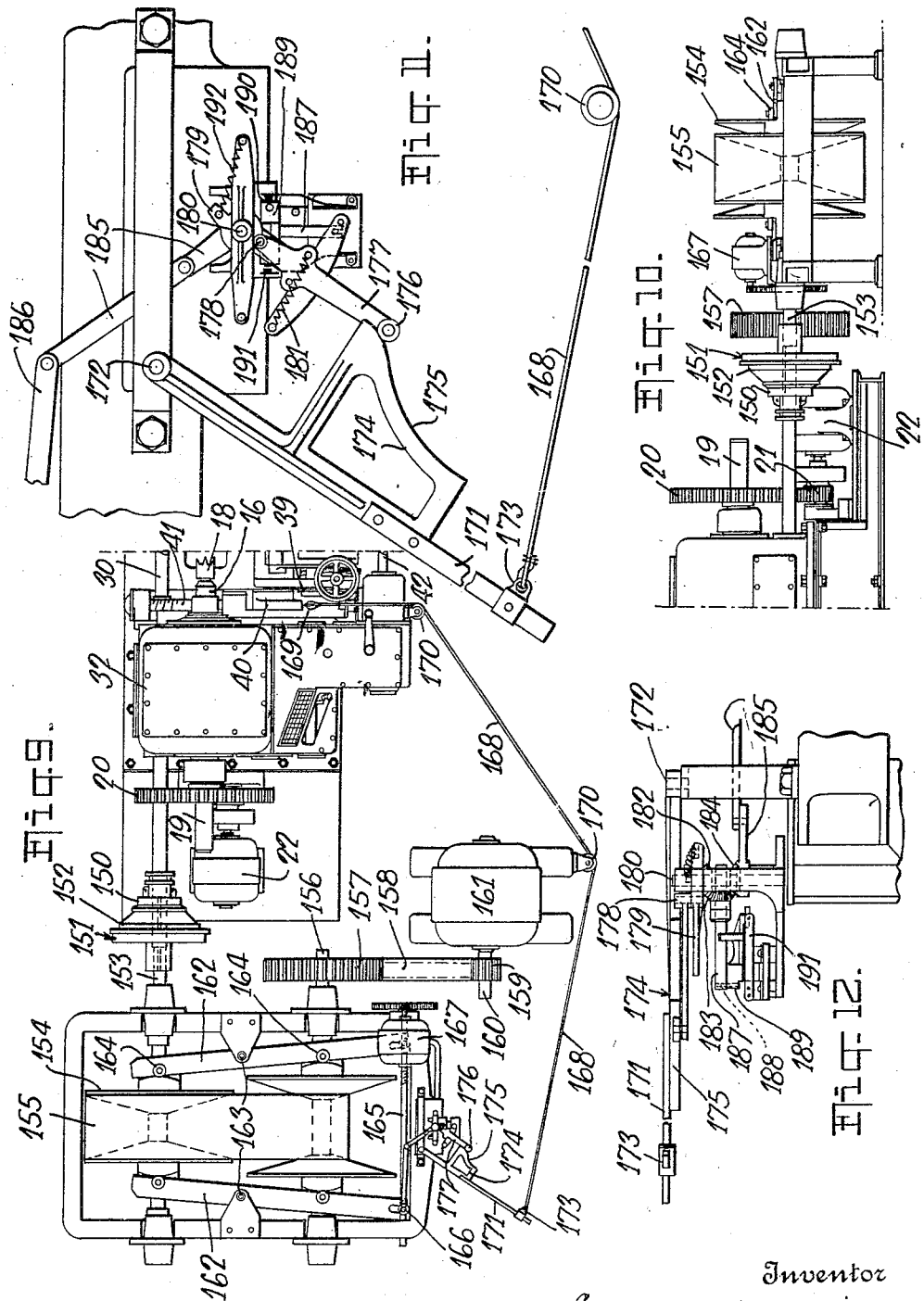

Patented Jan. 19, 1932

1,841,544

UNITED STATES PATENT OFFICE

ERICSSON H. MERRITT, OF LOCKPORT, NEW YORK, ASSIGNOR TO MERRITT ENGINEERING & SALES COMPANY, INC., OF LOCKPORT, NEW YORK, A CORPORATION OF NEW YORK

VENEER STRIPPING AND CLIPPING MACHINE

Application filed February 18, 1929, Serial No. 341,017, and in Russia October 6, 1928.

This invention relates to machines for stripping sheets of veneer or like material from a rotating block or log and for clipping the sheets into short lengths, and more particularly to a combined veneer lathe and clipper, and to correlated improvements and discoveries whereby and wherewith the operation thereof may be enhanced.

An object of the invention is directed to the provision in a combined lathe and clipper of improved means for synchronizing the speed of flow of the sheet of material from the lathe, and the speed of operation of the clipper so that the clipper will cut a sheet of material into predetermined lengths.

Another object is to provide particularly accurate means for regulating the relative operating speeds of a veneer lathe and a veneer clipper.

A more specific object is to provide improved means for regulating the speed of operation of the clipper in accordance with the speed of flow of the sheet of material from the lathe.

Another more specific object is to provide improved means for regulating the speed of operation of a conveyer in accordance with the speed of flow of the sheet of material from the lathe.

Another more specific object is to provide improved means for regulating the operating speed of the lathe so as to cause a constant speed of flow of a sheet of material therefrom.

A further object is to provide a fluid pressure operated clipper, the operation of which is controlled with especial accuracy to assure uniformity in the lengths into which the material is clipped.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention reference should be had to the following detailed description taken in connection with the accompanying drawings, in which:

Fig. 1 is a side view of a veneer lathe and clipper assembly embodying the invention;

Fig. 2 is a rear view of the lathe shown in Fig. 1;

Fig. 3 is a vertical section through the lathe in the direction of the arrows along the line 3—3 of Fig. 2;

Fig. 4 is a plan view of the right hand end of the lathe;

Fig. 5 is a partly sectional top view showing certain portions of the lathe in greater detail;

Fig. 6 is a horizontal section taken in the direction of the arrows along the line 6—6 in Fig. 1, and showing the forward end of the assembly;

Fig. 7 is a partly sectional front view of the clipper unit;

Fig. 8 is an enlarged detail view of a portion of the clipper operating means, taken from the side;

Fig. 9 is a plan view of the left hand end of a similar veneer lathe equipped with a modified form of controlling means embodying the invention;

Fig. 10 is a rear view thereof;

Fig. 11 is an enlarged detail view of the control switch shown in Fig. 9; and

Fig. 12 is a front view thereof.

The invention contemplates the provision of an improved machine for stripping sheets of material from a rotating block or log and for clipping the same into short lengths, the operations of which machine are efficiently and accurately controlled.

While the invention is directed to machines for accomplishing a variety of results, it finds its primary application in a veneer machine and is exemplified as embodied in such connection. In the exemplified machines, moreover, the invention is illustrated as used in connection with a machine such as disclosed in the co-pending application of Richard W. Stanley, Serial No. 340,761, filed herewith, and in the division thereof Serial No. 458,757 of May 31, 1930.

For the sake of facility of expression, the term "veneer" is used herein to indicate any sheet of material stripped from a block or log, and the term "log" is used to indicate any block or like member from which sheets of material are to be stripped; and it is to be understood that these and other expressions used are not employed in any restricted or particular sense.

In the exemplified machine, the veneer lathe shown in Figs. 2, 3, 4 and 5, is mounted on a frame piece 15, and is equipped with a pair of log rotating spindles 16 and 17. Each of these spindles is provided at its inner end with a log holding clamp 18, and provided at its outer end with a worm 19 which may be operated for dogging the clamp into engagement with the end of the log by any suitable means from any desired source of power. In the present instance, the worm on the spindle 16 is operated through the medium of a gear train 20—21 from a motor 22, and the worm on the spindle 17 is operated through the medium of a sprocket chain 23 from a motor 24.

Keyed to the spindles 16 and 17 respectively are sleeves 26 and 27, each provided with a gear 28 which meshes with pinion 29 on a main drive shaft 30 operated through the medium of suitable gearing by a motor 31. The sleeves 26 and 27 are rotatably mounted in the walls of casings 32 and 33 by means including tapered roller bearings 34.

Suitable mechanism is provided in order to strip the veneer from a log which is clamped between the spindles and rotated thereby. In Fig. 3, there is exemplified a pressure bar 35 and a knife 36 between which veneer-sheet 38 is extruded. The lathe knife and pressure bar are mounted upon a transversely-movable knife carriage 40, riding on ways 39, the knife and the pressure bar preferably being provided with manual adjusting means, as is known practice. For moving the carriage 40, there are provided a pair of worms 41 which are operatively connected with a shaft 42 by means of gears 43 and 44. To withdraw the knife so that a log may be inserted, or to move the knife against a log, the shaft 42 is rotated rapidly by a motor 45 to which the shaft is connected by means of a clutch 46. When, however, the lathe-knife is to be thrust regularly into the log to strip veneer therefrom, the shaft 42 is connected with the left-hand sleeve 26, Fig. 5, by means of suitable selective gearing inserted between a sprocket 47 on the sleeve 26 and a gear 48 on the shaft 42. A suitable clutch 49 is provided for disconnecting the shaft 42 when the same is operated by the motor 45.

From the lathe, the veneer sheet extends over a platform 51, on a suitable bed, such as provided by the endless belts 52, to a clipper unit, one form of which is shown in Fig. 7, and which comprises a clipper consisting of a knife 53 slidable in suitable ways in uprights 54. The exemplified clipper unit is of the type disclosed in the co-pending application of Richard W. Stanley, above referred to, which is designed to operate with unusual speed and accuracy and to avoid the vibration which oftens results at the upper end of the stroke when certain known types of clippers are employed. As exemplified, the unit comprises a knife-operating plunger 55 which is connected with the knife 53 by a toggle arrangement comprising a pair of toggle joints 56, each having upper toggle links 57 pivotally connected to a cross-bar 58 and lower toggle links 59 pivotally connected with the clipper knife 53.

A sheet of veneer is carried under the clipper by the belts 52 which extend about free rollers 60, Fig. 1, mounted adjacent the lathe, and rollers 61, Fig. 6, mounted on a rotatable shaft 62. The plunger 55 is connected by means of the links 64 to the stem 65 of a two-way piston operating in a fluid pressure chamber 67, from the opposite ends of which extend fluid pressure conduits 68 and 69 through which compressed air, steam or other desired fluid may be introduced into one chamber or the other as required for operating the piston.

It has been found that because of the difference in pressure area on the free end of the piston head and on its inner end, the smoothness and accuracy of operation of the clipper knife is sometimes interfered with to such an extent that the machine fails to give completely satisfactory results when the toggles are adjusted to retract the clipper knife an equal distance at the end of its forward and backward strokes. In order to remedy this condition, the present invention contemplates the adjustment of the length of the links 64 or of other of the operating connections so that the angle of the toggle arms at the end of the outward piston stroke, will be slightly greater than the angle of these arms at the end of the inward stroke. Thus, as will be clearly seen from Fig. 7, the clipper knife will be in its highest position at the end of the inward stroke when fluid pressure is to be applied to the free end of the piston head, as indicated in the dotted lines, and the clipper knife will be in a slightly lower position when at the end of the outward stroke, so that the loss of pressure area due to the presence of the piston stem will be compensated for. It will thus be seen that the time required for each clipping stroke will be the same, regardless of whether that stroke involves an outward or an inward plunger movement, and that, accordingly, if the supply of fluid pressure to the chambers at either side of the piston head is evenly spaced, the clipper knife will cut the veneer at the proper time to sever an accurately measured length of veneer, provided that the operation of the clipper and the speed of flow of veneer are otherwise synchronized, as, for instance, by means such as are hereinafter exemplified.

In the present instance, the fluid pressure conduits 68 and 69 lead to a control chamber 75 in which there reciprocates a plunger 76 arranged to act as a two-way valve whereby the operating fluid which enters the chamber 75 through an inlet conduit 77 may be directed either to the conduit 68 or to the conduit 69. The plunger 76 is actuated by a pivoted link 78, the free forked end of which embraces an eccentric 79, carried on the shaft 80 of a pinion 81, which meshes with the gear 82, rotated by a "Geneva" wheel 83, provided with four radial slots 84. The "Geneva" wheel is operated by a pin 85 carried on an adjustable-length sprocket chain 86, extending over sprocket wheels 87 and 88, the latter being mounted adjustably with respect to the former. When the clipper is to be operated automatically, the wheel 87 is suitably connected with a source of power. In the present instance it is adapted to be connected to the shaft 62 (which carries the pulley wheels 61 for the belt 52) by means of a clutch 91 operated by a control 92, the provision of the clutch making it possible to disconnect the wheel 87 from the shaft 62 when desired, in which case the mechanism may be operated by means of a hand wheel 93 on the wheel 88. In Fig. 6 the clutch 91 is shown in operative position for rotating the wheel 87 with the shaft 62.

Suitable means may be provided to prevent buckling of the veneer as it approaches the clipper. In the present instance, there is illustrated in Figs. 1 and 6, a plurality of belts 100, each extending between a free roller 101 and a roller 102, and each roller 102 is mounted on a shaft 104 which is operatively connected with a shaft 105 by suitable means such as the sprocket chain 106. The shaft 105 carries a gear 107 which meshes with the gear 108 keyed to the shaft 62.

In ordinary veneer lathe operation, where the speed of rotation of the spindles is constant, the speed of travel of the veneer sheet coming from the lathe decreases as the size of the log decreases, and an automatic operation of a clipper at a constant interval results in a steady decrease in the lengths of veneer clipped, with a consequent waste of veneer and inconvenience in handling the clipped sheets. It is accordingly most desirable to synchronize the speed of flow of veneer sheet from the log and the speed of clipper operation, and the present invention contemplates the provision of simple, accurate and efficient means for this purpose. In accordance with the invention, there is provided variable speed controlling means which are directly connected with, and positively actuated by, the lathe knife carriage so that the operation of the variable control is necessarily and accurately determined by the position of the lathe knife with respect to the center of the log.

One form of such means is exemplified in Figs. 1 to 8 inclusive, and another form of such means is exemplified in Figs. 9 to 12 inclusive.

In Figs. 1 and 3, there is shown a bracket 110, mounted on the lathe-knife carriage and moving therewith. To this bracket there is pivotally connected a rod 112 on the end of which a cam member 113 of a variable speed mechanism is carried. Against the opposite cam surfaces of the cam member 113 there rest a pair of rollers 114, each roller being mounted on a bar 115, pivoted at 116, and carrying a pair of annular members 117 against each of which there rests a conical member 118. Between the two pairs of conical members thus provided, there extends a belt 120. The ends of the arms 115 nearest the lathe are connected by a bar 121 carrying a spring 122, which serves to press these ends of the arms 115 together, and to press the rollers 114 against the cam surfaces of the member 113. The pair of conical members 118 nearest to the cam member 113 are slidably keyed on a shaft 123, which is rotated by a suitable source of power such as a motor 124 through the medium of a shaft 125 and gears 126 and 127. The pair of conical members 118 farthest from the cam member 113 are slidably keyed on a shaft 128, carrying a sprocket wheel 129, from which a sprocket chain 130 extends to a sprocket wheel 131. The wheel 131 is adapted to be connected to the shaft 62 by a suitable clutch such as shown at 132. This clutch is operated by a sleeve 140 which is adapted to be slid on the shaft 62 by means of a lever 141 through the medium of links 142 and 143, as is more fully set forth in the co-pending application of Richard W. Stanley, above referred to. If desired, a brake, such as shown at 148, may be carried on the sleeve to prevent the momentum of the belts 52 and the members associated therewith from carrying the sheet of veneer forward after the clutch 132 is withdrawn.

There is thus provided in the power-transmitting train for the clipper a self-contained speed varying unit comprising a control device and there is likewise provided means to cause the control device to be actuated by the movement of the knife carriage.

The cam surfaces of the cam member 113 are shaped so as to cause the clipper to cut accurately measured lengths of veneer throughout the whole range of operation of the lathe knife; these surfaces being preferably designed to allow for the constant period of downward movement of the clipper knife, since the ratio between this period and the speed of flow of the veneer sheet will vary as the latter speed decreases. To this end the cam member 113 is preferably shaped so that the divergence of the cam surfaces thereof will be sufficient to cause such additional decrease in the speed of the clipper operating shaft 62 as will compensate for the constant period of the knife stroke. By this special divergence of the cam surfaces the timing of the cutting portion of the knife stroke, rather than the timing of the stroke-initiating operations, is controlled, and the lengths of veneer are measured with particular accuracy.

By the control mechanism thus described, there is provided a lathe and clipper assembly wherein the clipper operates in a simple and effective manner to cut accurately measured lengths of veneer, and wherein the synchronism between the lathe and the clipper is accomplished without resort to any variation in the lathe speed which, in certain instances, is undesirable.

There are situations, however, wherein a control of the speed of rotation of the log by the spindles can be utilized to accomplish the desired synchronization, and there is exemplified in Figs. 9 to 12 a means of control which is directly connected with and positively operated by a lathe knife carriage so as to retain the advantages of a direct and positive control of the timing. In its exemplified form this control means is adapted to be employed in connection with, and is described as if associated with, a machine which may be in general similar to the machine shown in Figs. 1 to 8, except that the motor 31 and its associated gearing may be eliminated, and a direct drive for the shaft 62 may be provided in any suitable manner.

With a view to controlling the speed of the spindles 16 and 17 so as to increase the speed of rotation of the log as the diameter thereof decreases during operation, the machine heretofore exemplified is modified by extending the shaft 30 through the housing 32 to the driven element 150 of a friction clutch 151. The driving element 152 of this clutch is mounted on a shaft 153 of a variable speed mechanism of a type similar to that shown in Fig. 6, and comprising two pairs of conical members 154 between which a belt 155 extends. The conical members 154 of one pair are slidably mounted on the shaft 153 and the conical members of the other pair are slidably mounted on a shaft 156 which carries a driven wheel 157. A drive chain 158 extends from the wheel 157 to a driving wheel 159 carried on the drive shaft 160 operated by a motor 161. The relative spacing of the conical members 154 is controlled by a pair of arms 162, the pivot point of each of which is indicated at 163. Each arm 162 carries a pair of annular members 164, each of which rests against one of the conical members 154.

The angle between the arms 162 is controlled in the present instance by the rotation of a threaded shaft or shifting screw 165 to which each of the arms is connected by means of a swivel nut 166, a reversing fractional horse power motor 167 being provided to rotate the shaft. The operation of the motor is controlled, through the medium of a suitable switching arrangement, by a cable 168 which is connected at 169 to the lathe knife carriage 40 and is carried over sheaves 170. The form of switching arrangement exemplified in Figs. 11 and 12 comprises an arm 171 pivoted at 172 and having the cable 168 connected to the free end thereof at 173. Inasmuch as uniform movement of the lever 171 would not result in uniform speed variation if this movement were applied directly to the control for the variable speed mechanism shown, the arm 171 is provided with a compensating cam member 174 against the surface 175 of which there rests a roller 176 secured to a floating control lever 177 which is pivotally connected at 178 to a lever 179, the lever being pivoted on a pin 180. A tension spring 181 provides the operating connection between the levers 177 and 179. Fixedly secured to the lever 179 is a mitre gear 182 which is connected by means of a differential mitre gear 183 to a mitre gear 184 secured to a lever 185 pivoted on the pin 180 and connected by means including a link 186 with one of the arms 162. The differential mitre gear 183 is mounted on a floating lever 187 which is pivoted on the pin 180 and the free end of this lever is formed with a slot which engages a pin 188 carried on a pivoted contact lever 189 carrying movable contacts 190 which are adapted to be swung into engagement with one or the other of stationary contacts 191 for closing, respectively, the "forward" and "reverse" circuits of the control motor 167, or preferably of relays adapted to close the motor circuits.

As will be seen from the foregoing, the movement of the lathe knife carriage 40 toward the center of the log will exert a pull on the cable 168 which will result in the lever 171 being moved. Movement of the lever 171 will result in movement of the lever 177 which, because of the tension exerted on the connecting spring 181, will result in a movement of the lever 179 and will cause a rotation of the mitre gear 182. Since the mitre gear 184 is stationary, movement of the gear 182 will cause the gear 183 and the lever 187 to swing about the pin 180 so as to bring together one pair of contacts 190—191 so as to close the "forward" operating circuit of the control motor. As a result, the shifting screw is rotated slightly so as to swing the ends of the arms 162 together and to increase the speed of rotation of the shaft 30 and the spindles 16 and 17 a small amount. The movement of the shifting screw will also be transferred through the link 186 to the lever 185 so as to cause a partial revolution of the gear 184, which will swing the gear 183 and the lever 187 back to their former position and will break the contact and stop the control motor. When the lathe knife carriage is moved away from the log after the same has been cut down to the core, the pull on the lever 171 is released, and a spring 192 serves to return the lever 177 and the arm 171 to their original position and to cause a reverse inching movement to take place. This switching arrangement thus results in a steady inching movement of the shaft 165, and when connected with the lathe knife carriage, results in a very accurate regulation of the speed of the main drive shaft of the lathe.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. In a veneer stripping and clipping machine, the combination of a knife adapted to strip a continuous sheet of material from a rotating log, a carriage adapted to move the knife into the log, log rotating means, means for clipping the sheet of material into short lengths, and means connected with said knife carriage for controlling the speed of operation of one of the aforesaid means with respect to the speed of operation of the other of the aforesaid means, whereby the lengths of material clipped by the clipper means will be substantially uniform, said controlling means comprising a speed varying unit including an adjustable member and a control device movable in response to movement of the knife carriage and having a curved cam surface against which the adjustable member bears, said cam surface being adapted to impart a varying movement to the adjustable member during movement of said control device.

2. In a veneer-stripping and clipping machine, the combination of a knife adapted to strip a continuous sheet of material from a rotating log, log-rotating means, means for clipping a sheet of material into short lengths, and means for controlling the speed of operation of one of the aforesaid means with respect to the other of the aforesaid means, said controlling means comprising variable speed mechanism and means for regulating the operation of the variable speed mechanism in accordance with the variation between the speed of rotation of the log and the speed of flow of material from said stripping knife, said variable speed mechanism including an adjustable member and a control device movable in response to movement of the knife carriage and adapted to regulate the movement of said adjustable member, said control device being formed with a cam surface arranged to impart an increasing movement to said adjustable member during the movement of the stripping knife toward the centre of the log.

3. In a veneer stripping machine, the combination of a knife adapted to strip a continuous sheet of material from a rotating log, log rotating means including a speed varying unit, said speed varying unit including an adjustable member and a control member formed with a curved cam surface which governs the course of said adjustable member, and means to cause the movement of said control member in response to the relative movement of the knife and log, said cam surface being formed to impart an increasing movement to said adjustable member as the knife moves toward the center of the log.

4. In a veneer-stripping machine, the combination of a knife adapted to strip a continuous sheet of material from a rotating log, a carriage adapted to move the knife into the log, log-rotating means, driving means for the log-rotating means, variable speed mechanism inserted between said driving means and said log-rotating means, a control lever for said variable speed mechanism, an actuating lever for said control lever, said actuating lever being connected with said knife carriage, and means including a cam inserted between said actuating lever and said control lever for operating said variable speed mechanism in response to movements of said knife carriage.

5. In a veneer-stripping and clipping machine, the combination of a knife adapted to strip a continuous sheet of material from a rotating log, a carriage for said knife, means for clipping the sheet of material into short lengths, driving means for the clipper, variable speed mechanism inserted in said driving means, an adjustable member, and a member connected with said knife carriage and having a curved cam surface which governs the course of said adjustable member to regulate said variable speed mechanism in response to movement of the knife carriage whereby the driving means will operate the clipper to cut the sheet of material into substantially equal lengths.

6. In a veneer-stripping and clipping machine, the combination of a knife adapted to strip a continuous sheet of material from a rotating log, means for causing said knife to strip the sheet at a speed which decreases as the diameter of the log decreases, means for clipping the sheet of material into short lengths, means independent of the log for driving the clipping means, and variable speed mechanism inserted in said driving means to decrease the speed of operation of the clipper as the speed of flow of veneer from said knife decreases with a decrease in the diameter of the log.

7. In a veneer-stripping and clipping machine, the combination of a knife movable toward the center of a rotating log to strip a continuous sheet of material therefrom, means for clipping the sheet of material into short lengths, means for driving said clipping means, variable speed mechanism inserted in said driving means, a member connected with said knife and movable in a direction parallel to the direction of movement thereof, said member being formed with a curved cam surface, an adjustable member, means holding said adjustable member against said cam surface, and power-transmitting means forming a part of said variable speed mechanism and operatively connected with said adjustable member.

8. In a veneer-stripping and clipping machine, the combination of a knife movable toward the center of a rotating log to strip a continuous sheet of material therefrom, means for clipping the sheet of material into short lengths, means for driving said clipping means, variable speed mechanism inserted in said driving means, said variable speed mechanism comprising pairs of oppositely disposed cone-shaped members mounted on parallel axes and arranged to support a belt therebetween, and means for adjusting the relative positions of the conical members in adjacent pairs in response to the movement of the lathe knife carriage toward the center of the log to decrease the speed of operation of said clipping means in response to a decrease of the speed of flow of veneer from said knife.

9. In a veneer-stripping and clipping machine, the combination of a knife for stripping a continuous sheet of material from a rotating log, a reciprocable clipper knife, means for periodically operating the clipper knife to cut the sheet of material into short lengths, means including variable speed mechanism for controlling the timing of said operating means, means adjustable in response to the movement of said stripping knife for controlling the operation of said variable speed mechanism, and means associated with said adjustable means to compensate for the constant period of the clipper knife stroke.

10. In a veneer stripping and clipping machine, the combination of a knife adapted to strip a continuous sheet of material from a rotating log, a carriage adapted to move the knife into the log, means for clipping the sheet of material into short lengths, a power-transmitting train for said clipping means, a self-contained speed varying unit forming a part of said train and having its own control device, and means to cause said control device to be actuated by the movement of said knife carriage.

11. In a veneer stripping and clipping machine, the combination of a knife adapted to strip a sheet of material from a rotating log, means to cause a constant speed relative movement of knife and log during the stripping operation, means for clipping the sheet of material into short lengths, a power-transmitting train for said clipping means, a speed varying unit forming a part of said train and comprising a control device, and means connecting the control device with the movable one of said relatively movable members to cause the control device to be moved by the movement of said movable one of said members.

12. In a veneer stripping and clipping machine, the combination of a knife adapted to strip a continuous sheet of material from a rotating log, a carriage adapted to move the knife into the log, conveyor means for carrying the sheet of material away from the knife, means for clipping the sheet of material into short lengths, a power-transmitting train for said clipping and conveyor means, a self-contained speed varying unit forming a part of said train and having its own control device, and means to cause said control device to be actuated by the movement of said knife carriage.

13. In a veneer stripping and clipping machine, the combination of a knife adapted to strip a continuous sheet of material from a rotating log, a carriage adapted to move the knife into the log, conveyor means for carrying the sheet of material away from the knife, means for clipping the sheet of material into short lengths, a power-transmitting train for said conveyor means, a self-contained speed varying unit forming a part of said train and having its own control device, and means to cause said control device to be actuated by the movement of said knife carriage.

14. In a veneer stripping and clipping machine, the combination of a knife adapted to strip a sheet of veneer from a rotating log, means to cause a constant speed relative movement of the knife and log during the clipping operation, means for clipping the sheet of material into short lengths, means to carry the sheet of material to the clipping means, a power-transmitting train for said clipping means and said carrying means, a speed varying unit forming a part of said train and comprising a control device, and means connecting the control device with the movable one of said relatively movable members to cause the control device to be moved by the movement of said movable one of said members.

15. In a veneer stripping and clipping machine, the combination of a knife adapted to strip a continuous sheet of material from a rotating log, a carriage adapted to move the knife into the log, means for clipping the sheet of material into short lengths, a power-transmitting train for said clipping means, a speed varying unit of the type having two pairs of relatively adjustable cones with a belt therebetween forming a part of said power-transmitting train, a control device for said speed varying unit, and means to cause the control device to be moved by the movement of the knife carriage, said control device being formed with a cam surface arranged to vary the movement of said cones in response to the movement of said control device.

In testimony whereof I affix my signature.

ERICSSON H. MERRITT.